(12) United States Patent
Eckert et al.

(10) Patent No.: US 6,859,711 B2
(45) Date of Patent: Feb. 22, 2005

(54) PROCESS AND A DEVICE FOR DETERMINING THE DRIVING TORQUE OF A VEHICLE

(75) Inventors: Alfred Eckert, Mainz-Hechtsheim (DE); Jürgen Diebold, Eschborn (DE); Thomas Berthold, Darmstadt (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/175,614

(22) Filed: Sep. 17, 2002

(65) Prior Publication Data

US 2003/0040862 A1 Feb. 27, 2003

Related U.S. Application Data

(62) Division of application No. 09/529,211, filed as application No. PCT/EP98/06564 on Oct. 16, 1998, now Pat. No. 6,416,441.

(30) Foreign Application Priority Data

| Oct. 17, 1997 | (DE) | 197 46 062 |
| Oct. 17, 1997 | (DE) | 197 46 061 |
| Jan. 22, 1998 | (DE) | 198 02 217 |

(51) Int. Cl.$^7$ ............................................. G06G 7/76
(52) U.S. Cl. ............................. 701/70; 701/51; 701/84
(58) Field of Search ............................. 701/36, 51, 53, 701/54, 65, 70, 84; 477/185, 186

(56) References Cited

U.S. PATENT DOCUMENTS

| 3,921,446 A | 11/1975 | Ludloff |
| 4,535,412 A | 8/1985 | Cederquist |
| 5,241,855 A | 9/1993 | Cullen et al. |
| 5,452,207 A | 9/1995 | Hrovat et al. |
| 5,658,213 A | 8/1997 | Sato et al. |
| 5,669,851 A | 9/1997 | Tietze et al. |
| 5,703,776 A | 12/1997 | Soung |
| 6,135,920 A | * 10/2000 | Kamiya et al. ............. 477/185 |
| 6,173,226 B1 | * 1/2001 | Yoshida et al. ............. 701/51 |
| 6,253,144 B1 | * 6/2001 | Yamamura et al. ........... 701/96 |

FOREIGN PATENT DOCUMENTS

| DE | 32 46 798 | 6/1984 |
| DE | 41 38 822 | 5/1992 |
| DE | 42 34 692 | 4/1993 |
| DE | 43 06 086 | 9/1993 |
| DE | 43 04 779 | 12/1993 |

(List continued on next page.)

OTHER PUBLICATIONS

Search Report of the German Patent Office for Application No. 198 02 217.4.
Debes et al.: "Dynamische Stabilitäts Control DSC der Baureihe 7 von BMW—Teil 1", ATZ, vol. 99, No. 3, p. 134, 136, 139 (1997).
VanZanten et al.: "Die Fahrdynamikregelung von Bosch", at–Automatisierungstechnik, vol. 44, No. 7, p. 359–365 (1996).

Primary Examiner—Richard M. Camby
(74) Attorney, Agent, or Firm—Honigman Miller Schwartz and Cohn LLP (57) ABSTRACT

The invention proposes a process for determining the driving torque of a vehicle as it is starting. This process and device uses a model of the idling properties of the engine, a comparing element for the output values of the model and corresponding measured values or values derived therefrom, and a determining element for determining the driving torque of the vehicle according to the results of the comparison. Furthermore, the invention discloses a process and device for determining an externally generated variable that drives or brakes the vehicle as well as for supporting uphill starting. In addition, processes and devices for determining externally generated variables/torques as well as for supporting uphill starting are disclosed.

28 Claims, 10 Drawing Sheets

FOREIGN PATENT DOCUMENTS

| | | |
|---|---|---|
| DE | 43 16 107 | 12/1993 |
| DE | 43 28 893 | 3/1994 |
| DE | 43 27 912 | 9/1994 |
| DE | 44 28 351 | 2/1995 |
| DE | 44 46 859 | 6/1995 |
| DE | 195 20 579 | 12/1995 |
| DE | 195 08 168 | 9/1996 |
| DE | 196 49 424 | 6/1997 |
| DE | 196 12 455 | 10/1997 |
| DE | 196 32 337 | 2/1998 |
| EP | 0 164 873 | 12/1985 |
| EP | 0 492 199 | 7/1992 |
| GB | 20 02 525 | 2/1979 |

\* cited by examiner

PROCESS AND A DEVICE FOR DETERMINING THE DRIVING TORQUE OF A VEHICLE

This application is a divisional of Ser. No. 09/529,211 filed Jul. 27, 2000 now U.S. Pat. No. 6,416,441, which is a 371 of PCT/EP98/06564, filed Oct. 16, 1998.

TECHNICAL FIELD

The present invention relates to a process and a device for determining the driving torque of a vehicle when it starts. In addition, it also relates to a process and a device for determining externally generated variables that drive or brake a vehicle as well as for supporting uphill starting.

BACKGROUND OF THE INVENTION

Generally when a vehicle begins moving the operating conditions of the engine, amongst other things, change in so far as the motor changes from an idle state (in this application idle does not necessarily refer to the idling speed of the motor, but always to the operation of the motor without the vehicle as a load) to normal running (loaded operation) where the motor propels the vehicle, so that the motor output is used to a large extent in the manner defined to drive the vehicle. The transient state is controlled by means of the clutch in the manual transmissions. In automatic transmissions the change of states is controlled by the torque converter. However, in all cases it is difficult to determine the torque available for the actual driving torque during the transition. Thus, it is not exactly known which part of the engine torque is available for propelling the vehicle. In many applications this has proven disadvantageous, for example in connection with auxiliary support units for uphill starting. When a vehicle has to initiate movement uphill, the downgrade force acts as a rearward-driving torque at first, whereas the braking force and engine torque act as a stopping or forward-driving force. When an auxiliary support unit for uphill starting is to be provided, it must be ensured, amongst other things, that the vehicle does not roll backwards under any circumstances. Despite the fact that the engine is in the above-mentioned transient state, all forward-driving and rearward-driving influences have to be known, so that suitable control elements, for example a remotely controllable vehicle driving brake (e.g. an analog remotely controllable vacuum brake-force booster) and/or a remotely controllable parking brake (e.g. an electric parking brake), can be influenced in an appropriate manner.

Furthermore, the present invention relates to a process and a device for determining an externally generated variable that drives or brakes a vehicle and in particular such a torque. The longitudinal dynamics of a vehicle—speed and acceleration—are influenced by different internal and external variables, in particular torques. Internal variables/torques according to this description, for example, are the engine torque, braking torque or road resistance (that can be described internally, for example, on the basis of tables based on values gained by experience or through constant values or equations which take into consideration the vehicle motion state with the characteristics/parameters of the vehicle). These variables can be determined comparatively accurately by means of various measures, so that their influence on the longitudinal dynamics can be taken into account. Furthermore, there are also externally generated variables which arise in particularly variable forms in addition to the above-mentioned (internally describable) road resistance. This includes, for example, the downgrade force when a vehicle is driving on a sloped roadway. The downgrade force gives rise to a torque that affects the longitudinal dynamics of the vehicle. The same is true, for example, in connection with windforce, extraordinary rolling resistance or similar forces. These externally generated variables either cannot be determined at all or only with great difficulties by means of customary sensors. This invention renders unnecessary any sensor technology generally required for this purpose.

The present invention discloses a process and a device for determining the driving torque of a vehicle as it is starting.

Furthermore, the present invention discloses a process and a device for determining externally caused variables that drive or brake a vehicle, in particular such a torque.

Still further, the present invention discloses a process and a device to support uphill starting.

The driving torque of a vehicle as it is starting is obtained by determining the idling properties of the engine on the basis of a model and comparing meaningful output values of this model to actually measured corresponding values (observer principle). The difference between the values of the model and the actually measured variables can be traced back to the fact that the engine does not run completely unloaded in the transient state from no-load running to loaded running, but gives off a part of its power to the vehicle (already) during the transient state. The driving torque of the vehicle effective during the transient state can be inferred by evaluating a variable of the model and the measured variable. In this connection, please refer once more to the definition of "idle state" provided above.

The variables generated externally and, in particular, torques are determined by another observer. This observer receives variables generated internally that drive or brake a vehicle, in particular torques. On the basis of these it determines the possible development of the longitudinal dynamics of a vehicle, compares this result with the actually measured values of the longitudinal dynamics and infers externally generated variables that drive or brake a vehicle, in particular torques, from any deviations.

Figure 10:
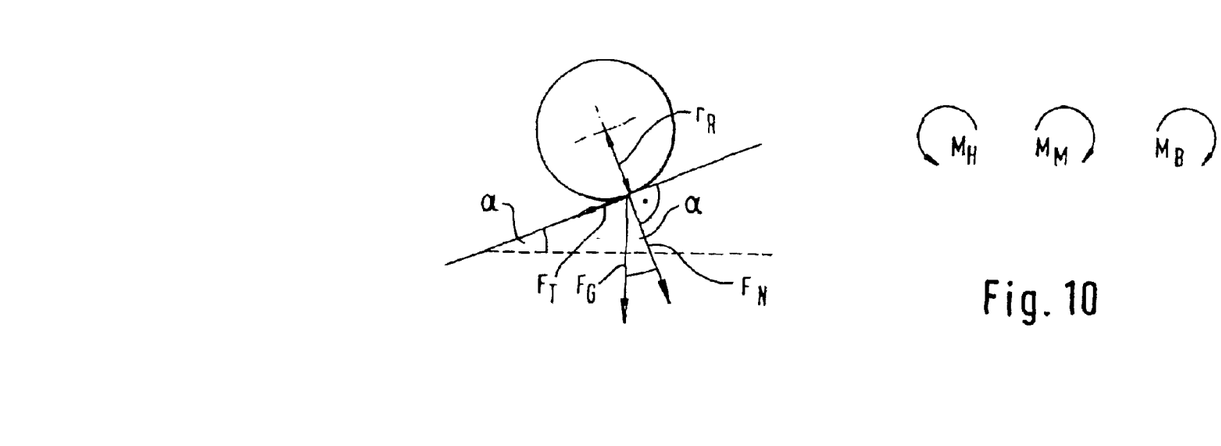
FIG. 10 shows schematically applicable physical interrelationships in an exemplary application.

Knowledge of externally generated variables that drive or brake a vehicle, in particular such torques, is desirable for various applications. One example of such an application is a support device for uphill starting. Support devices for uphill starting are designed to simplify the complicated handling of brake, parking brake, clutch and engine when a vehicle starts uphill. At the same time, however, it must be ensured that the vehicle does not roll backwards under any circumstances, for example to avoid colliding with any vehicles behind it. When a vehicle is to start uphill, the laws diagrammatically shown in FIG. 10 apply as an initial approximation. The weight force $F_G$ of the vehicle can be reduced to a normal component $F_N$ and a tangential component $F_T$ at the tire of a one-wheel model. Together with the tire radius $r_R$ $F_T$ results in a downforce torque $M_H$ according to the following equation:

$$M_H = F_G \cdot \sin\alpha \cdot r_R.$$

For this purpose, $\alpha$ is the angle of gradient. Without any additional influences, the downforce torque $M_H$ would cause the vehicle to roll downhill. It is counter-acted by the braking torque $M_B$ that stops the vehicle and the engine torque $M_M$ that is additionally introduced during starting. A support device for uphill starting, for example, may have an influence on the braking torque $M_B$. This influence must be such, however, that it is always ensured that the inequality $$M_H < M_B + M_M$$

is fulfilled. Only then can it be definitely ensured that the vehicle does not roll backwards. In order to fulfill the above equation, the downforce torque must be known.

Similar considerations as those described above apply in dynamic situations (vehicle speed is not equal to zero). When a vehicle moves uphill slowly in city traffic, for example, considerations as those described above may become important. In such situations it would be desirable to know the externally generated variables that drive or brake a vehicle, in particular such torques, so as to be able to influence the vehicle suitably.

DETAILED DESCRIPTION OF THE PREFERRED EMBODIMENTS

Before a first embodiment is described by referring to FIG. 1, an example of an idling model will be explained by referring to FIG. 2. An idling model suitable for the invention must meet the following requirements:

It must have suitable input and output variables, and if it is to be useful for the transient state, it must describe as precisely as possible both the static and dynamic idling behavior of the engine.

Figure 2:
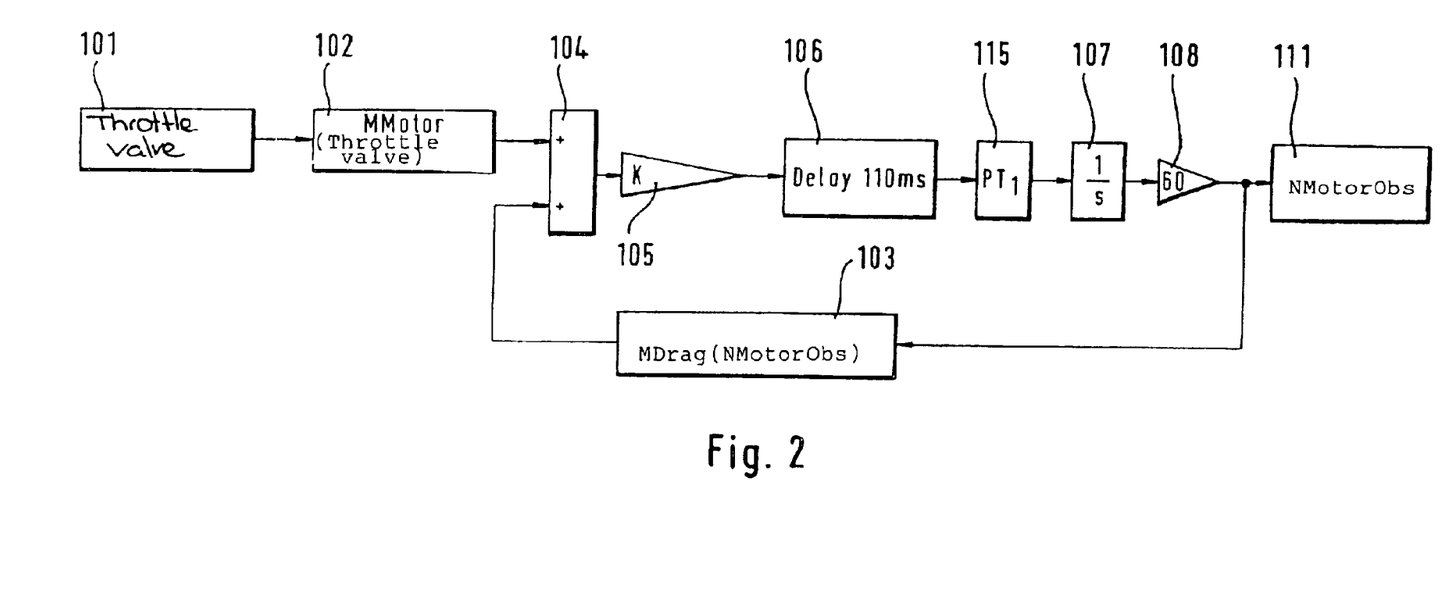
FIG. 2 is an example of an idling model that may be used according to the present invention.

The idling model shown in FIG. 2 fulfills these requirements. Its input variable is a torque and the output variable it provides is an estimated engine speed NMotorObs. The model takes into consideration that the friction torque effective internally in the engine, also called drag torque, counteracts the idling torque actually delivered by the engine. This counter-action is reproduced in adder 104. The actual engine idling torque NMotor, for example, can be determined according to the position of the throttle valve on the basis of a map, an equation, a polygon curve etc. This idling engine torque NMotor forms one input of the adder 104. Reference number 101 indicates a throttle valve sensor or a connection where a corresponding signal is applied. Reference number 102 is a first determining element for determining the idling engine torque NMotor. At its output adder 104 provides the difference between idling torque and drag torque. When they are equal and, hence, the difference is equal to zero, the engine is running at a constant speed.

The dynamics of the engine are reproduced by units 106, 107 and 115, 106 is a delay element used to reproduce dead times in the engine (for example the time delay between a change in the angle of the throttle valve and a change in the amount of gas actually injected into the cylinder); unit 115 is a delay element of the first or higher order, generally used to reproduce sequential delays in the system.

Unit 107 is an integrator which integrates the signal at its input. Its output signal rises when its input signal is positive (i.e. when the engine torque is greater than the drag torque) and it drops when its input signal is negative (i.e. when the drag torque is greater than the engine torque). When the two are balanced, the input signal at the integrator is zero and its output signal is constant.

Components 105 and 108 are constants that are used to take into account engine constants and carry out conversions. Thus, there results a variable NMotorObs that corresponds to the engine speed. Since the engine drag torque MDrag, mentioned above, primarily depends on the engine speed, the value NMotorObs can be used as an input variable for determining element 103 to determine engine drag torque. The determining element 103 may be a characteristics map, an equation, a polygon curve etc.

Thus, an idling model for an engine, which has the total torque as its input variable and the engine speed as its output variable, is obtained. Depending on the accuracy required or desired of the model, components needed to reproduce the dynamics should be provided. Components 106 and 115 in particular are advantageous, but not absolutely necessary.

A first embodiment according to the present invention will be described with reference to FIG. 1, which shows a device for determining the driving torque of a vehicle based on the principle of an observer. It is based on the following concept. The "theoretical" idling speed is determined by means of the above-mentioned idling model. It is compared to the actual engine speed measured. A difference results in particular during the above-mentioned transient states because the motor does not run only in an idle state but partially already serves to drive the vehicle. Therefore, the comparison of the estimated and measured engine speed can be used to infer the driving torque of the vehicle for driving the vehicle.

Figure 1:
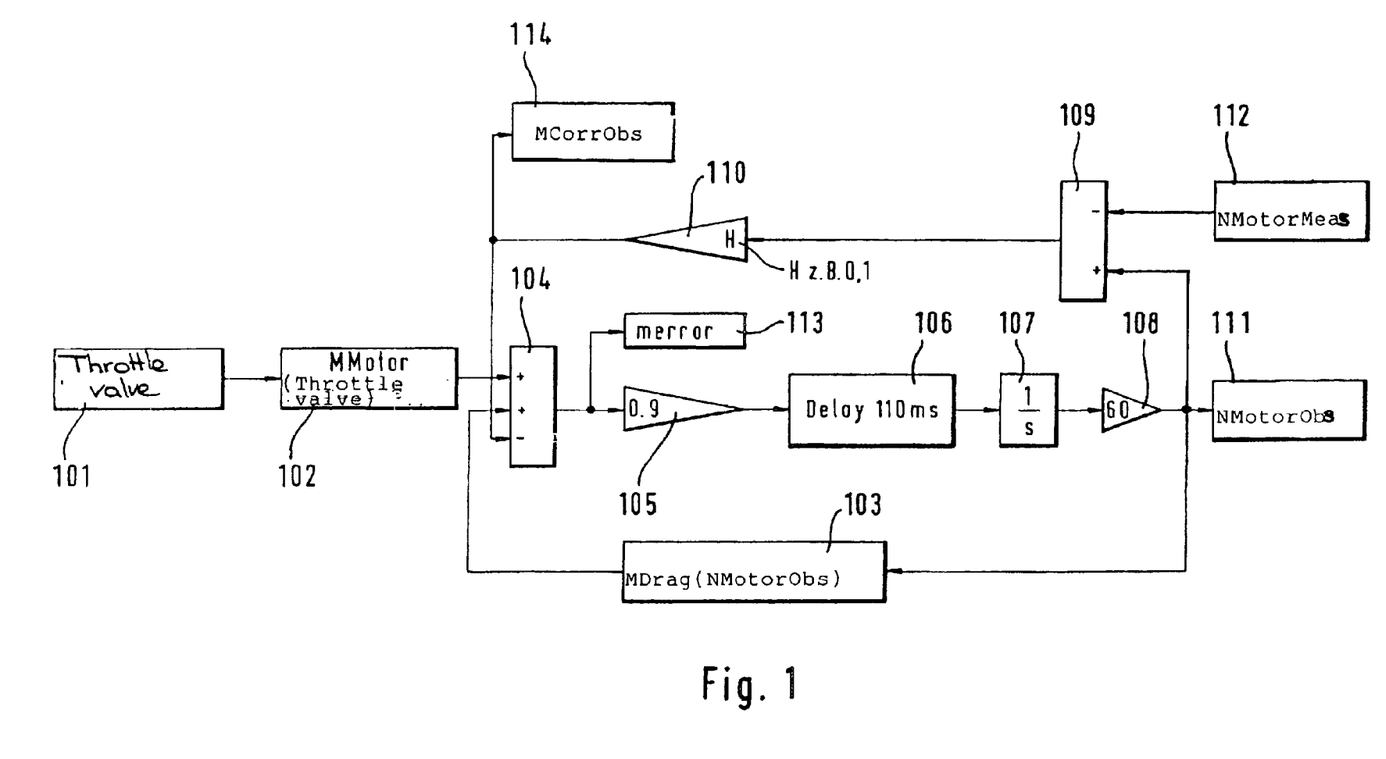
FIG. 1 shows a first embodiment for determining the driving torque according to the present invention.

The idling model already described above on the basis of FIG. 2 is shown in the bottom part of FIG. 1. The estimated engine speed NMotorObs is compared with the actual engine speed measured NMotorMeas. In particular, the difference between the two is taken in subtraction element 109. Following a calibration 110 (please note that in this application calibration refers to a proportional conversion, e.g. for the purpose of adjusting values, conversion or normalization) this value can be used as the direct measure for the driving torque of the vehicle MCorrObs. Furthermore, inverse feedback of the torque occurs at summing point 104 to render the idling model stable again.

Delay element 106 sets a delay between 50 and 150 ms, preferably between 100 and 120 ms. Reference number 112 refers to a device for determining the actual engine speed NMotorMeas. In the simplest case this can be a sensor that outputs an analog or digital signal. However, more complex filter functions also may be connected. Finally, device 112 could also be the point of tapping a data bus containing the corresponding measured values. Calibration 108, for example, can convert revolutions per second to revolutions per minute. Consequently, it would be a factor 60. Calibrations 105 and 109 also serve to adapt the data to the required normalization.

Figure 3:
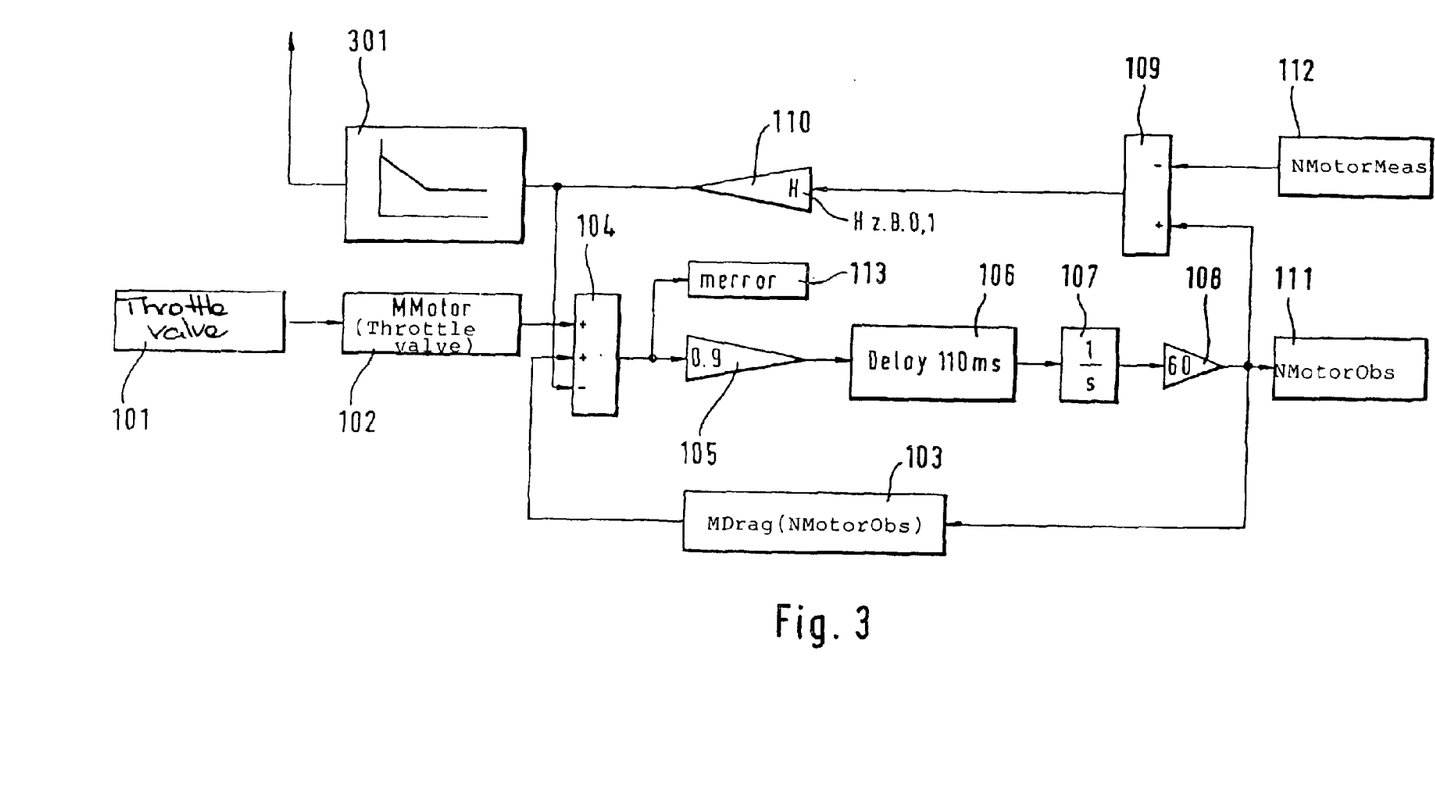
FIG. 3 shows another embodiment for determining the driving torque according to the present invention.

FIG. 3 shows another embodiment according to the invention. It is suitable for vehicles with automatic transmissions where a converter is provided between the transmission and engine. Since the relationships between speeds and torques are more complex in such a converter than in a clutch and, in particular, may be non-linear, the difference between the actual speed NMotorMeas and estimated speed NMotorObs may be used as the measure for the driving torque of the vehicle; however, better results can be obtained if the relationships in the converter itself are taken into consideration. This is done by means of converter model 301, which reproduces a characteristic curve, as is shown qualitatively in FIG. 4. As in the embodiment according to FIG. 1, a torque "error" is inferred from the difference between the actual and estimated engine speed, which is also fed back to the idling model at summing point 104. However, the error torque is used to determine the actual driving torque of the vehicle by means of converter model 301. This can be done with the help of additional variables, for example with the rate of speed from the turbine speed, which can be determined through the total transmission ratio on the basis of the wheel speeds, and the pump speed, which can be determined from the engine speed. The driving torque of the vehicle is then the output of converter model 301.

Figure 5:
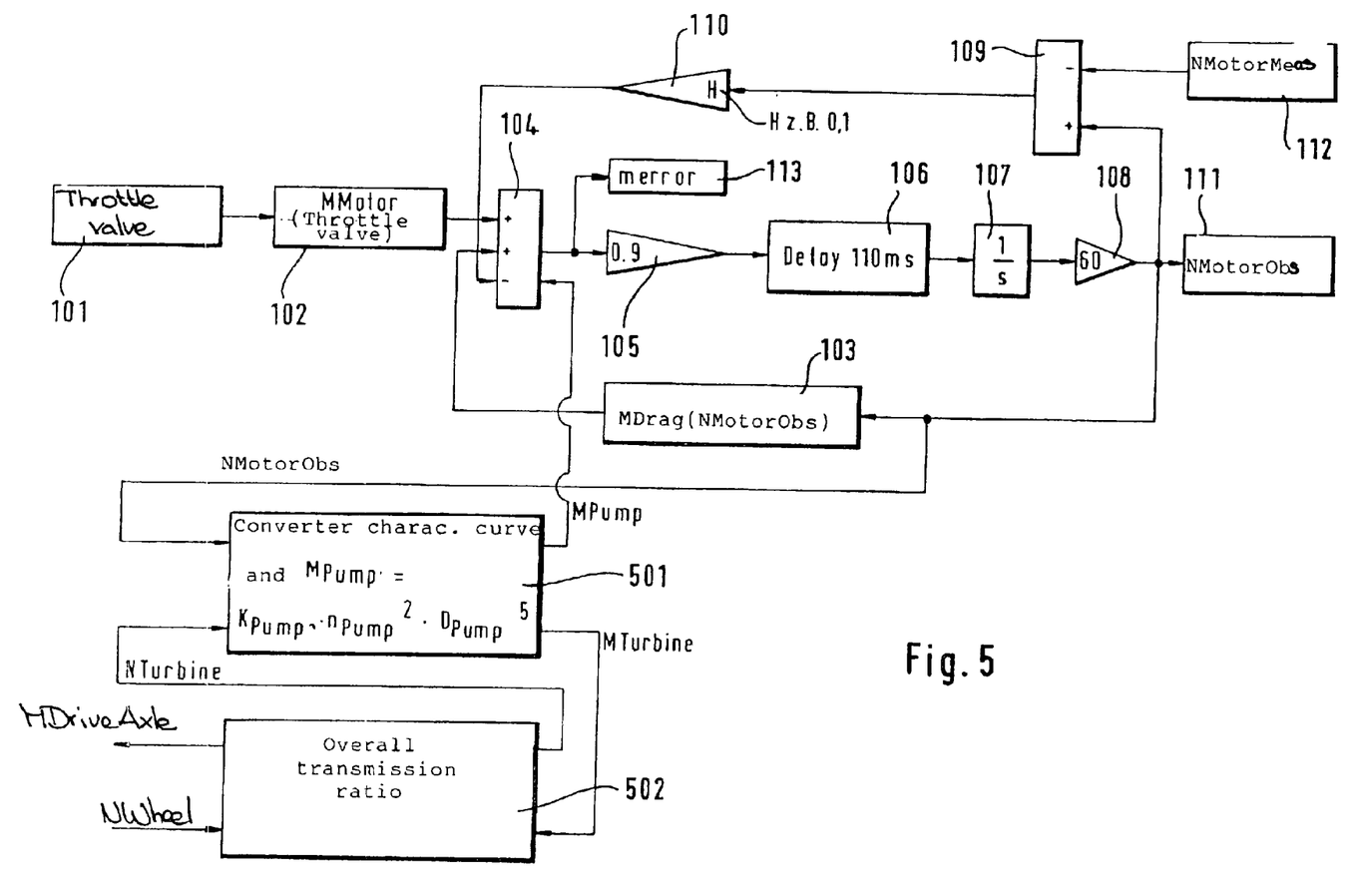
FIG. 5 shows another embodiment for determining the driving torque according to the present invention.

Another embodiment according to the invention is shown in FIG. 5. It differs from the embodiment shown in FIG. 3 in that at least one output of a more complex converter model 501, 502 is used to improve the estimated engine speed in the form of a feedback to the idling model and that the driving torque of the vehicle is no longer determined directly from the difference between the estimated engine speed NMotorObs and actual engine speed NMotorMeas, but rather from the estimated engine speed NMotorObs obtained from the idling model.

In the embodiment shown in FIG. 5, the feedback of the normalized difference in speed from subtractor 109 is maintained. However, it is used only for compensating the residual error in the idling model. Although the actual compensation around the pump unit also is carried out at summing point 104, a pump torque MPump obtained from the converter model 501, 502 is used. Converter model 501, 502 can be divided into a converter characteristic curve 501 and a transmission model 502. The driving torque of the vehicle then results from transmission model 502, which transmits the output torque of the converter MTurbine to the drive axle. In addition transmission model 502 receives at least one wheel speed NWheel and outputs a turbine speed NTurbine, which can be used as an input variable for the converter model.

Figure 4:
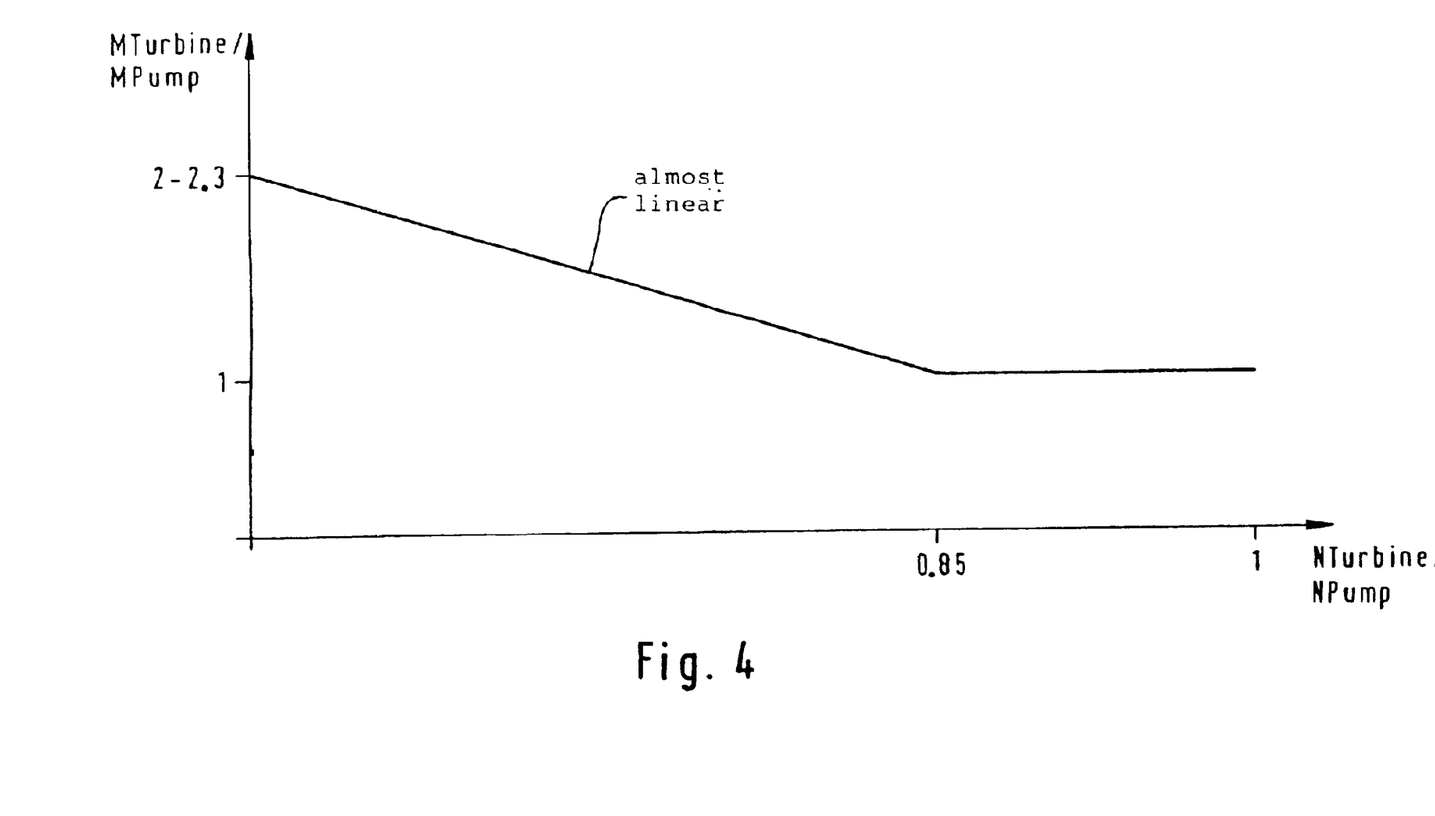
FIG. 4 is an example of a map of a torque converter.

In particular the converter can be described by means of a model based on the following equation:

$$M_{Pump} = K_{Pump} \cdot n_{Pump}^2 \cdot D_{Pump}^5$$

where $M_{Pump}$ is the pump torque of the converter (input torque of the converter), $K_{Pump}$ is a constant, $n_{Pump}$ is the pump speed and $D_{Pump}$ is the diameter of the pump wheel. Furthermore, converter model 501 uses a converter characteristic curve which, similar to FIG. 4, indicates the relationship between the pump torque and turbine torque according to the speeds.

Figure 6:
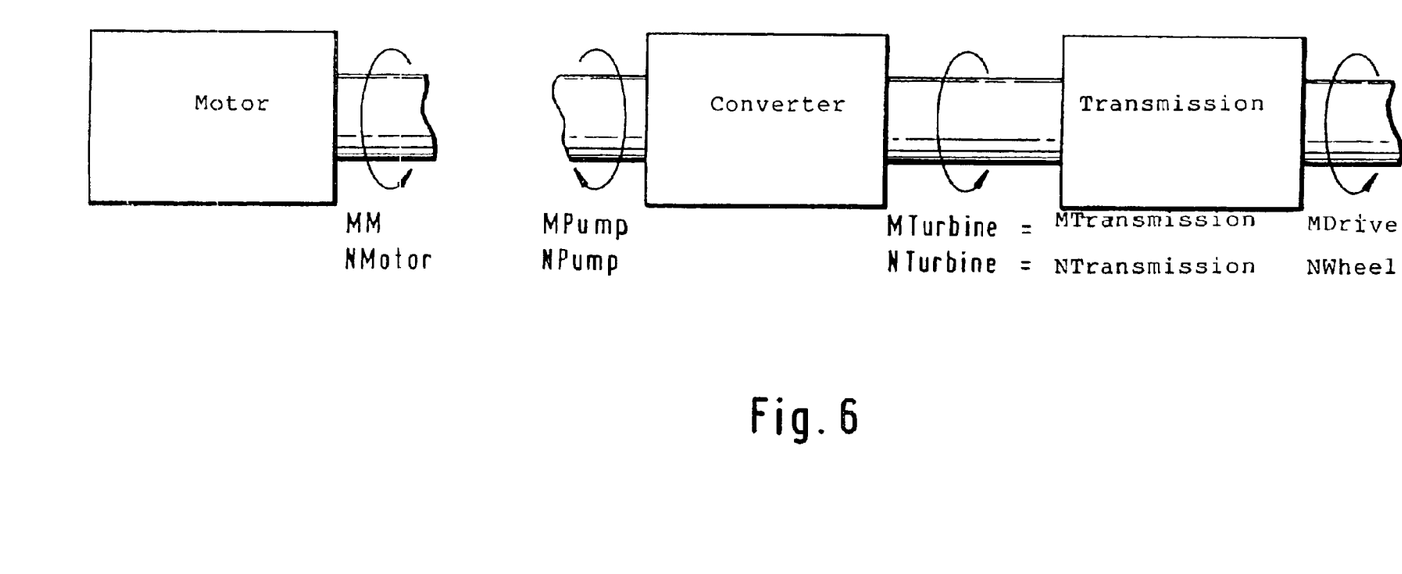
FIG. 6 is a schematic representation of the torques in a vehicle with an automatic transmission.

FIG. 6 is a schematic representation of the relationship between the speeds and torques in the drive train of a vehicle. The engine generates an output torque MM at an engine speed NMotor. The converter picks up the pump torque MPump and rotates at the speed NPump that is equal to the engine speed NMotor. At its output end, the converter has the turbine torque MTurbine and the speed NTurbine, each of which is equal to the values of the transmission torque MTransmission and the transmission speed NTransmission at the input end. Corresponding to the overall transmission ratio and taking into consideration dynamic effects, this results in the actual driving torque of the vehicle MDrive and the wheel speed NWheel.

The advantage of the embodiment according to FIG. 5 is that a more precise estimate of the estimated engine speed NMotorObs can be obtained since the converter is modeled more accurately and at least one output variable is fed back to the idling model. The idling model itself is needed to determine the estimated engine speed NMotorObs, on the basis of which the converter model works. Since at least one output variable of the converter model is fed back to the idling model in the embodiment shown in FIG. 5, the observer is relieved of handling the essential static errors and can be designed in a more favorable manner as regards dynamic effects. For this purpose, the converter model uses the estimated engine speed NMotorObs obtained from the observer and not the actual engine speed, since the converter model itself contains a feedback to the observer.

In the embodiments shown in FIGS. 1, 3 and 5 a very specific idling model is shown; it always corresponds to FIG. 2. Other idling models are conceivable, provided they sufficiently satisfy the above-mentioned requirements. Preferably the process described is executed continuously or initiated periodically.

Figure 7:
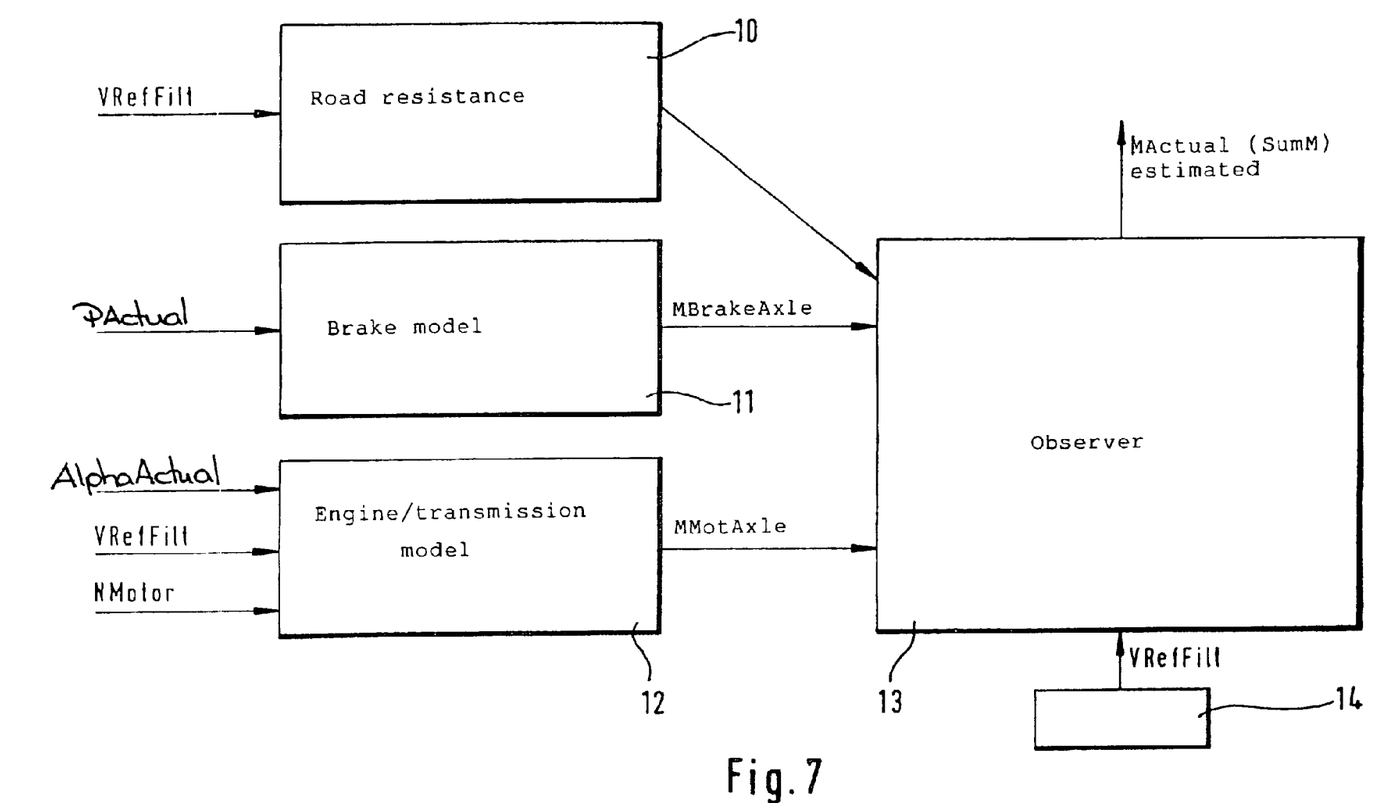
FIG. 7 is a block diagram of an embodiment for determining external torques according to the present invention.

FIG. 7 shows an embodiment according to the invention for determining externally generated torques. Elements 10 to 12 are devices for determining internal or internally generated torques. In particular an element 12 for determining the engine torque MMotAxle and an element 11 for determining a braking torque MBrakeAxle may be provided. In addition, an element 10 for determining a road resistance MRoadRes may be provided. Elements 10 to 12 work according to certain input variables. In particular elements 11 and 12 may be models and/or tables that model or describe the behavior of the brake and/or engine/transmission and provide the desired output variables.

On the basis of a model and with reference to the above-mentioned input variables, observer 13 determines the "theoretical" running properties or the "theoretical" longitudinal dynamics, in particular the speed, of the vehicle, taking into account characteristic values, too. Characteristic values, for example, are the tire radius or vehicle mass. Moreover, observer 13 receives a measured value from a corresponding element 14, which corresponds to the theoretical value. Given a sufficiently accurate model of the longitudinal dynamics, a difference between the theoretical and measured values can be attributed to externally generated, non-modeled, variables, in particular torques, so that precisely these external variables can be inferred from this deviation.

Figure 8:
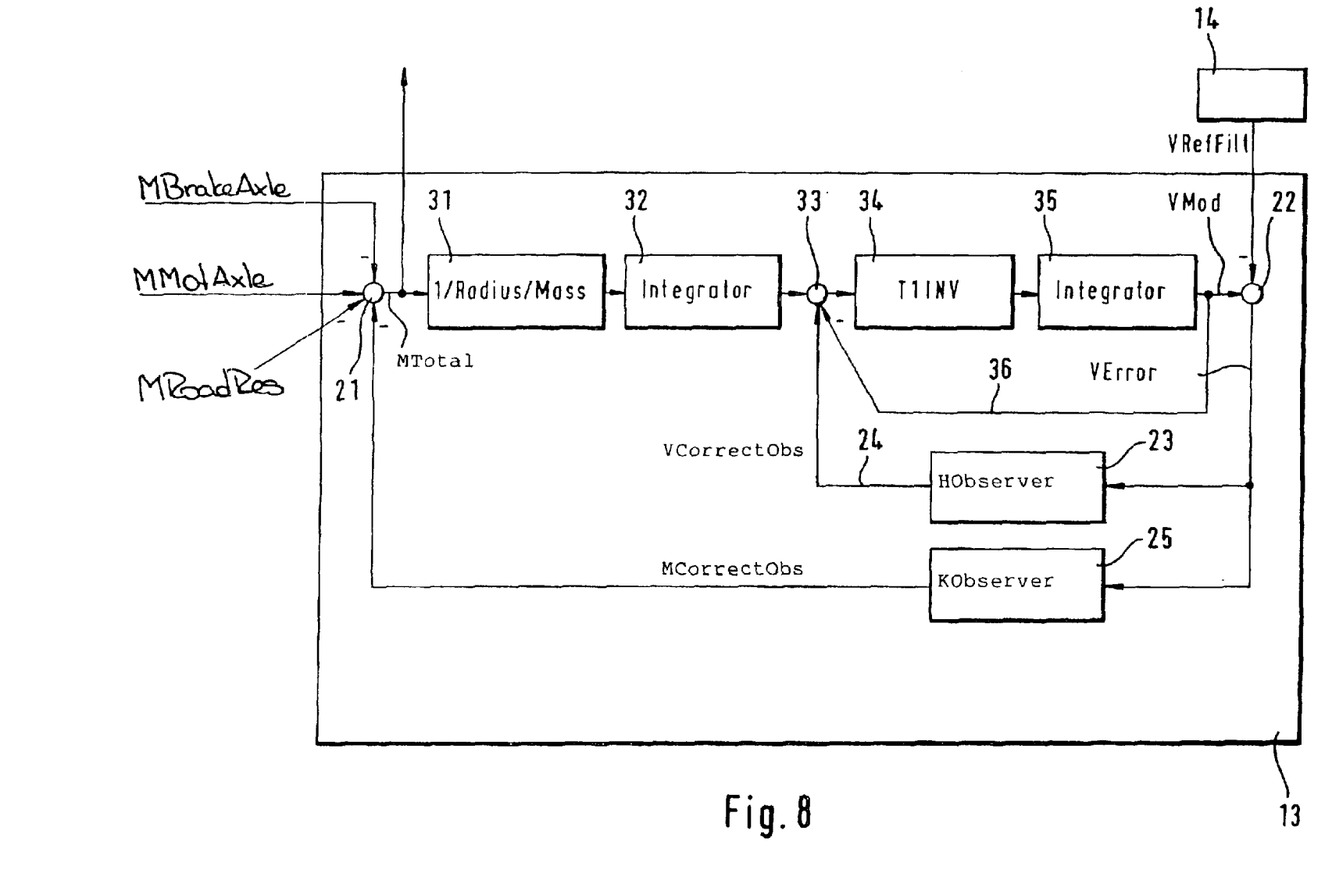
FIG. 8 shows the observer from FIG. 7.

FIG. 8 provides a more detailed representation of observer 13 from FIG. 7. Observer 13 exhibits a model of the running characteristics or longitudinal dynamics of the vehicle (reference numbers 31 to 36). In addition it exhibits an element for determining the external variables (numbers 21, 22, 25). Before the function of observer 13 is explained in more detail on the basis of FIG. 8, the model of the running properties or longitudinal dynamics of the vehicle will be described on the basis of FIG. 9, which once again shows components 31 to 36 from FIG. 8 for reasons of clarity.

The model of the running characteristics of the vehicle or for its longitudinal dynamics must satisfy at least the same two requirements as mentioned above, i.e. it has to have suitable input and output values and it must sufficiently take into account static and dynamic effects if it is to be suitable for the present invention.

Figure 9:
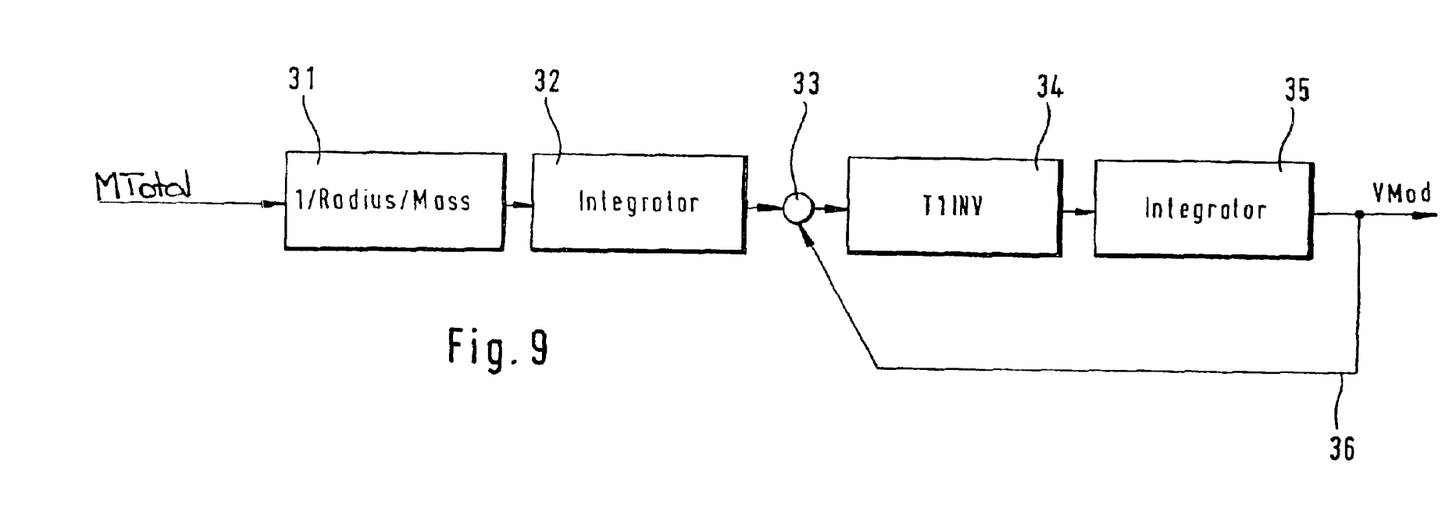
FIG. 9 is an example of a model for the vehicle dynamics.

The model in FIG. 9 satisfies these requirements. As its input value it receives an overall torque that acts on the vehicle. This overall torque MTotal is the sum of all accelerating and decelerating torques. If the overall torque MTotal is equal to zero, the vehicle is being driven at constant speed. If it is greater than zero, the vehicle is being accelerated; if it is negative, the vehicle is being decelerated. In the calibration 31, the overall torque is calibrated according to the wheel radius and vehicle mass. In this connection "calibration" is understood to mean a proportional conversion that, for example, is used for conversions, normalization or value adjustments. Thus, a variable corresponding to an acceleration is obtained. In integrator 32 this value is integrated, and a variable corresponding to a speed is obtained. In addition, units 33 to 36 which reproduce the dynamics is provided. In the embodiment shown, this is a $PT_1$ element, which only gradually transmits changes at the input to the output. The $PT_1$ element consists of a subtractor 33, calibration 34, integrator 35 and feedback 36 which is supplied at subtractor 33. The time constant of the $PT_1$ element is determined by means of the value of the calibration 34. The fact that real systems basically always show delayed responses to changes in their input values is taken into account by the $PT_1$ element. Thus, the reproduction of the vehicle dynamics can be improved. A speed VMod results as the output, which the model in FIG. 9 determined as the "theoretical" speed of the vehicle on the basis of the input overall torque MTotal.

The sequence of the individual components can also be shown differently than in FIG. 9. The inverse feedback 23, 24 in FIG. 8, however, should be supplied after the integrator 32. The element 14 for determining the actual vehicle speed VRefFilt can be a sensor that outputs a corresponding signal. However, it can also be a more complex device that carries out appropriate evaluation and filtering measures in order to receive signals that are as free of interference as possible.

The vehicle model described with reference to FIG. 9 should be understood as an example. Other models that satisfy the above-mentioned requirements may also be used.

Turning once again to FIG. 8, the utilization of the model shown in FIG. 9 in the observer 13 will explained. The "theoretical" vehicle speed VMod determined by the model is compared to the actual vehicle speed VRefFilt. In particular, the difference between the model speed (also referred to as estimated vehicle speed) and actual speed (also referred to as actual vehicle speed)—VRefFilt—is formed in the subtractor 22. The difference between the estimated and actual vehicle can be traced back to externally generated, non-modeled variables and particularly torques and, hence, conclusions about precisely these external variables and particularly torques can be drawn. For example, when the vehicle is driving uphill, the externally generated torque has a decelerating effect. If this external torque were not taken into account, the estimated speed would be too high and, in particular, may be higher than the actual vehicle speed. When the vehicle is driving downhill, the downgrade force has an accelerating effect. Accordingly, if this downgrade force were not taken into consideration, the estimated vehicle speed VMod would be less than the actual vehicle speed VRefFilt. Consequently, the externally generated variable, in particular the externally generated torque, can be determined by means of the deviation and particularly the difference between the estimated and actual vehicle speed. In order to ensure that the observer 13 generally works in a stable manner, the determined external torque can be added—taking into account the signs—to the other torques that were already determined (from devices 10 to 12). For this purpose it is supplied at the summing point 21. Element 25 is a calibration that converts, preferably proportionally, the speed difference to the corresponding torque error. Thus, the output of element 25, the signal MCorrectObs, actually is the desired externally generated torque, which can be used as the output signal and, as mentioned before, can be fed back to the observer at summing point 21.

From the control standpoint, a feedback 23, 24 may be provided to feed back a signal proportional to the difference between estimated vehicle speed and actual vehicle speed to the vehicle model after the integrator. The stability and dynamic properties of the model are improved by this. The inverse feedback, for example, can take place at summing point 33.

The device according to the invention can be implemented through discrete components. It can also be formed by an appropriately programmed computer which receives the corresponding input variables, outputs the desired output variables and has access to data that may still be needed. Preferably the process is carried out continuously or initiated periodically.

Figure 11:
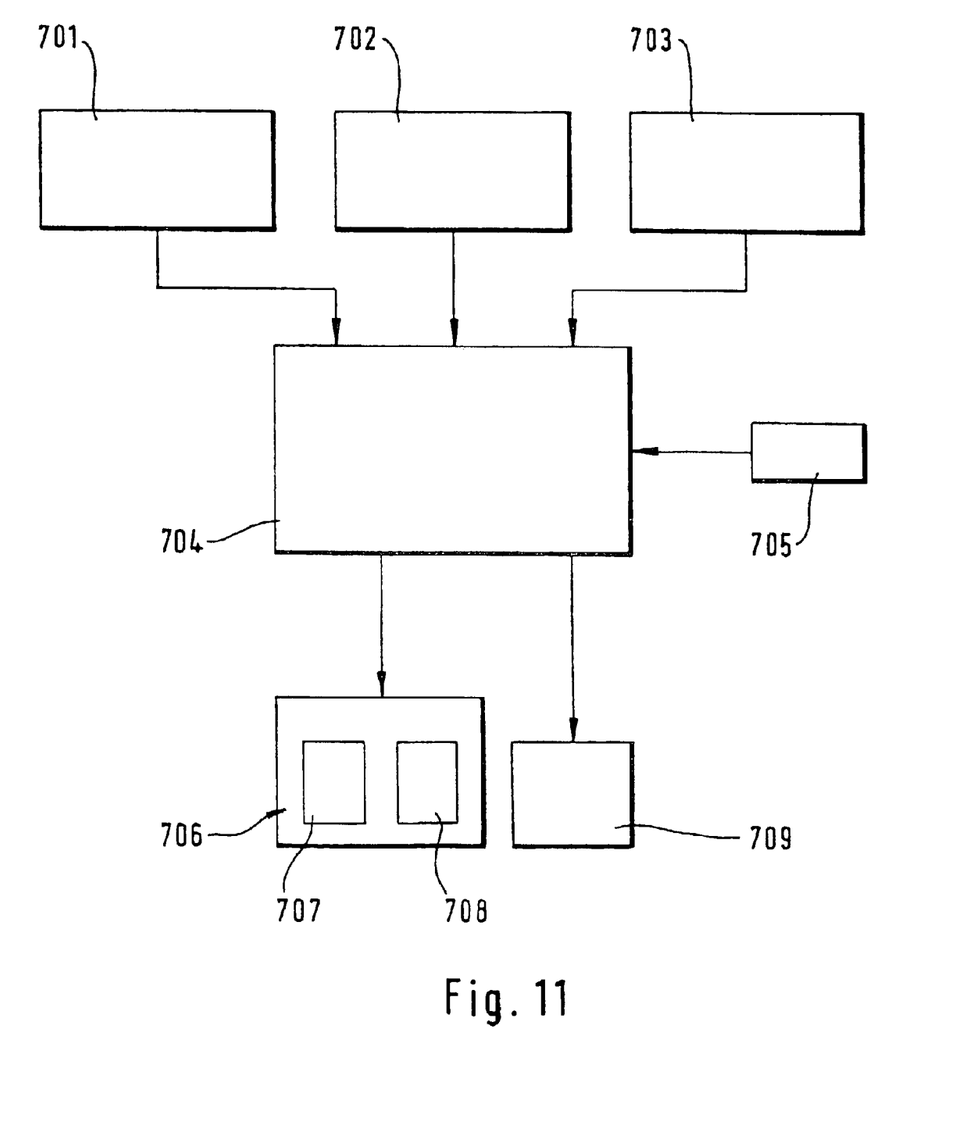
FIG. 11 is a schematic representation of a support device for uphill starting according to the present invention.

Based on the processes and devices according to the invention, it is possible to determine the driving torque of the vehicle during transient states as well as externally generated torques. This can be used, for example, to realize a device for supporting uphill starting, as is shown schematically in FIG. 11. In order to prevent a vehicle from rolling backwards as it is starting uphill, the following condition must be satisfied:

$$NMotorObs+MBrake>MOutput$$

where NMotorObs, for example, is the determined driving torque of the vehicle described above; MBrake is the torque braking the vehicle; and MOutput (=MCorrectObs from FIG. 8) is the externally generated torque caused by the downgrade force. The latter cannot be influenced. The engine torque changes according to the driver's wishes and, in particular, according to the angle of the gas pedal or the throttle valve, and the supplied driving torque of the vehicle can, particularly as described above, be determined in the determining element 701. The externally generated downgrade force can, particularly as described above, be determined in the determining element 702. In addition, the braking torque of the brake system 706 can be determined in a determining element 703, with the service brake 707 and parking brake 708 being taken into consideration, if necessary. Corresponding to the equation stated above, the braking torque can be influenced, for example via the brake system 706, by an influencing device 704 which receives the determined values mentioned above. The brake system 706 comprises the service brake 707 and the parking brake 708, with one of the two brakes or both together being operated by external control, i.e. independently of any activation by the driver. In particular, external control without or in addition to activation by the driver is possible. It is also conceivable that the driving torque of the vehicle be influenced via the engine 709. Besides the above-mentioned determined values, the influencing device 704 can receive other input variables from suitable devices 705. Furthermore, the influencing device 704 appropriately coordinates the external control of the brake 706 through the influencing device 704 itself, the driver's activation of the brake 706, any influence on the driving torque of the vehicle via the engine 709 through the influencing device 704 itself, and any influence on the driving torque of the vehicle via the engine 709 through the driver.

In particular, the braking torque can be reduced according to the constant downgrade force and the rising driving torque as the vehicle starts or the clutch is engaged or the engine is revved-up, until the vehicle starts rolling forward.

The device according to the invention can be implemented by means of discrete components. It can also be formed by an appropriately programmed computer which receives the required input signals, outputs the output signals and finds the required data and parameters in corresponding memories.

What is claimed is:

1. A process for determining the driving torque of a vehicle as the vehicle is starting, comprising the steps:
   determining an estimated engine speed when the engine is in a non-loaded state on the basis of a model,
   determining the actual engine speed on the basis of measured values,
   determining the driving torque of the vehicle according to the actual and estimated engine speed.

2. A process according to claim 1, further including the step of determining the estimated engine speed on the basis of the idling engine torque wherein the idling engine torque is determined based on measured values.

3. A process according to claim 2, further including the step of also using the driving torque of the vehicle to estimated engine speed.

4. A process according to claim 3, wherein the step of determining the estimated engine speed further includes the steps of:
   determining an engine drag torque,
   adding the torques acting on the engine according to their signs, followed by calibrating, delaying and integrating.

5. A process according to claim 4, wherein the step of determining the estimated engine speed further includes adding a delay of first or higher order.

6. A process according to claim 1, wherein the driving torque of the vehicle is determined according to the difference between the actual and estimated engine speed.

7. A process according to claim 4, wherein the engine drag torque is determined according to an engine speed.

8. A process according to claim 2, wherein the idling engine torque is determined, in part, according to the angle of the throttle valve.

9. A process according to claim 1, wherein the driving torque is determined taking into consideration the properties of a torque converter.

10. A process according to claim 9, wherein the characteristics of the torque converter are taken into consideration after forming the difference between the actual and estimated engine speed according to a characteristics map or an equation.

11. A process according to claim 9, wherein the characteristics of the torque converter are determined according to the estimated engine speed and at least the speed of one vehicle wheel on the basis of a model, with this model also providing the driving torque of the vehicle.

12. A process according to claim 11, wherein the characteristics of the torque converter include factoring in a pump torque of the torque converter, and the estimated engine speed also is determined according to the torque converter pump torque.

13. A device for determining the driving torque of a vehicle as the vehicle commences movement, comprising the steps of:
   modeling means for modeling the idling properties of the engine in a non-loaded state,
   a comparing element for the output values of the model and corresponding measured values or values derived therefrom, and
   means for deriving the driving torque of a vehicle according to the results of the comparison.

14. A device according to claim 6, wherein said modeling means includes a first determining element for determining the idling engine torque, and wherein said comparing element includes,
   a second and a third determining element, said second determining element for determining an estimated engine speed based on the idling engine torque, and said
   third determining element for determining the actual engine speed on the basis of measured values, and wherein said deriving means includes,
   a fourth determining element for determining the driving torque of the vehicle according to the actual and estimated engine speed.

15. A device according to claim 14, wherein the third determining element determines the estimated engine speed also according to the driving torque of the vehicle.

16. A device according to claim 15, wherein the third determining element further includes a fifth determining element for determining an engine drag torque, an adder to add the torques acting on the engine according to their signs, and a calibrating element, a first delay element, and an integrator.

17. A device according to claim 16, further including a second delay element of first or higher order is provided in the third determining element.

18. A device according to claim 14, wherein the fourth determining element includes a subtractor that forms the difference between the actual and the estimated engine speed.

19. A device according to claim 16, wherein the fifth determining element determines the engine drag torque according to an engine speed.

20. A device according to claim 14, wherein the engine torque is determined according to the angle of the throttle valve with reference to an equation or a characteristics map.

21. A device according to claim 14, further including a torque converter model wherein the driving torque of the vehicle is determined taking into consideration an output of the torque converter model.

22. A device according to claim 21, wherein the torque converter model acts according to the difference between the actual and estimated engine speed and in particular according to a characteristics map or an equation.

23. A process according to claim 21, wherein the torque converter model receives the estimated engine speed and at least one wheel speed and outputs the driving torque of the vehicle.

24. A device according to claim 23, wherein the converter model outputs a pump torque and the third determining element determines the estimated engine speed also according to the pump torque.

25. A process for determining an externally generated variable that drives or brakes a vehicle, comprising the steps of:
   determining the running properties of the vehicle on the basis of a model,
   comparing the values output by the model with corresponding measured values or values derived therefrom, and
   determining the externally generated variable according to the results of the comparison.

26. A process according to claim 25, wherein said determining the running properties further includes:
   determining internal torques or forces that drive or brake the vehicle, and wherein the comparing step further includes, determining an estimated vehicle speed based on the determined torques or forces, and determining the actual vehicle speed on the basis of measured values, and wherein said determining the externally generated variable includes determining torque, according to the actual and estimated vehicle speed.

27. A device for determining an externally generated variable, comprising: means for modeling the running properties of the vehicle, a comparing element for comparing model output values with corresponding measured values or values derived therefrom, and an element for determining the externally generated variable according to the result of the comparison.

28. A device according to claim 27, wherein said means for modeling include a first modeling element for modeling internal torques or forces that drive or brake the vehicle, a second modeling element for determining an estimated vehicle speed on the basis of determined torques or forces, means for determining the actual vehicle speed on the basis of measured values, and means for determining a torque, according to the actual and estimated vehicle speed.

* * * * *